Patented Dec. 27, 1938

2,141,631

UNITED STATES PATENT OFFICE 2,141,631

WOOD-SHAPING MACHINE

William M. Whitney and Austin W. Hawes, Winchendon, Mass., assignors to Baxter D. Whitney & Son, Inc., Winchendon, Mass., a corporation of Massachusetts Refiled for abandoned application Serial No. 734,632, July 11, 1934. This application September 26, 1936, Serial No. 102,732

5 Claims. (Cl. 144—145)

This application is refiled for abandoned application No. 734,632, filed July 11, 1934.

This invention relates to wood working machines and more particularly to that type of such machines now generally known as shapers, as exemplified in the patent to Sawyer No. 1,567,865, dated December 29, 1925.

In machines of the above mentioned type a rotary cutter acts upon the work blank which is itself mounted upon or secured to a work carrier or form running in contact with a guide or collar concentric with the cutter spindle and fed past the cutter by engagement between a sprocket rotated concentric with the spindle and engaging a sprocket chain on the work carrier.

The work carrier or form as heretofore constructed has been normally under the influence of a weight or similar mechanical device for holding the work carrier or form against the guide or collar, and as the work carrier or form is rotated at less speed than the cutter shaft and has a varying contour it has been given permissive movement towards and from the guide or collar concentric with the cutter spindle.

One of the objects of the present invention is to provide fluid actuated means such as air under pressure for moving and holding the work carrier or form toward and in engagement with the guide or collar and yet permit the varying movements of the work carrier or form toward and from the cutter as prescribed by its contour.

Another object of the invention is to provide an improved clamping member for the work form and pneumatic controlling means therefor.

The invention and novel features thereof will best be made clear from the following description and accompanying drawings of one preferred form thereof.

Figure 1:
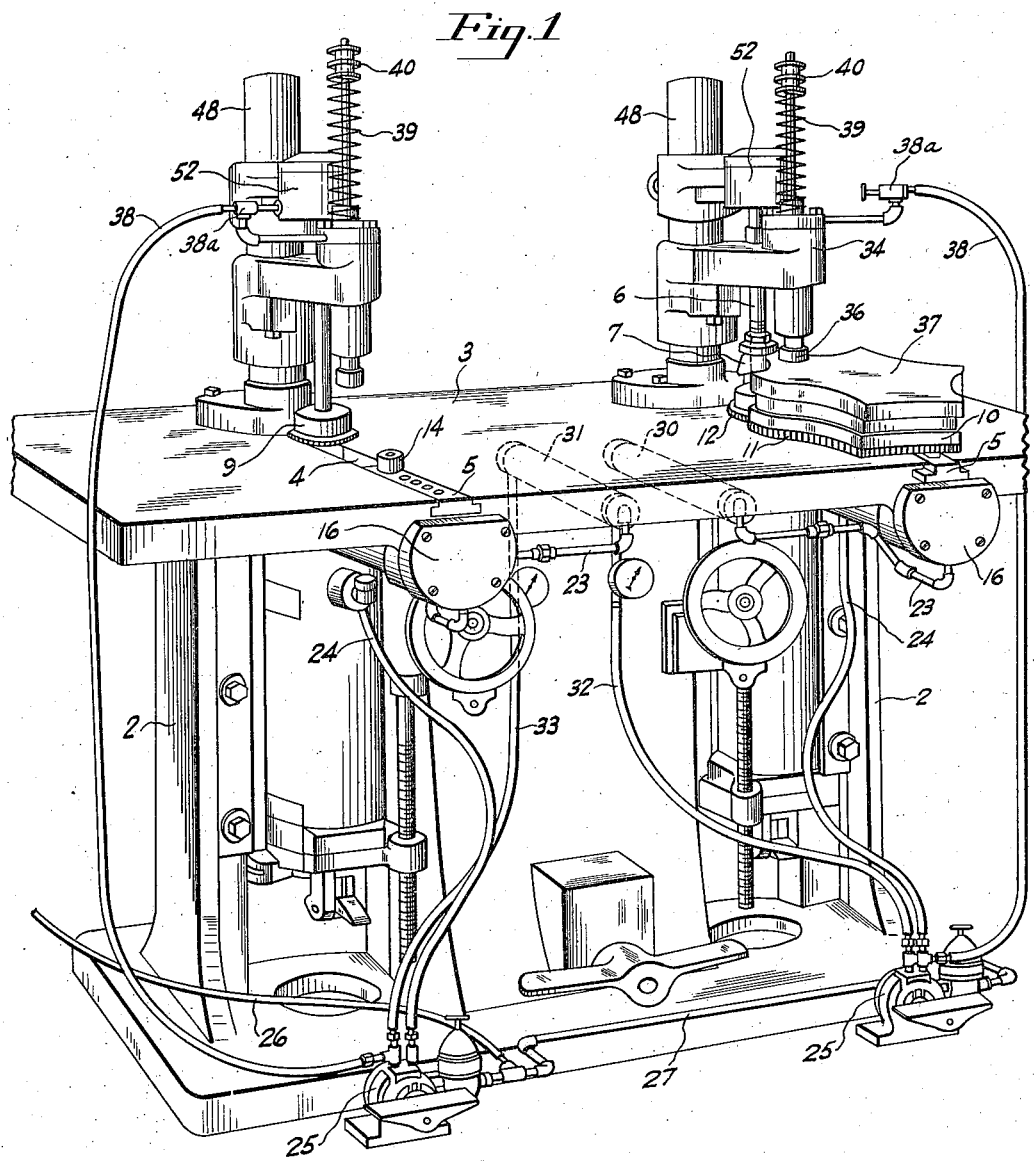
Figure 1 is a perspective view of a double spindle power feed shaper, one of the work carriers or forms being shown in operative position at the right of Fig. 1, while at the left the work carrier or form is omitted to show the construction of the work carrier slide.

The machine frame may be of any usual or appropriate character for the support of the operating parts and as shown comprises the base portion 1 from which rise the columns 2 to which the table 3 is connected.

The table 3 is provided with the guiding slots 4 for the support of a slide 5, it being understood that in the illustrated machine these parts are duplicated.

Mounted on the machine frame, as shown, is the cutter spindle 6 to which a cutter 7 is secured and rotary movement is imparted to the cutter shaft or spindle through appropriate driving means which in the present instance is shown as a motor 8 directly on the spindle 6 and below the table 3. The details of the parts so far described may be varied indefinitely and as they are now well known in the art further elucidation thereof appears unnecessary.

Connected to the sprocket assembly and concentric with the cutter shaft or spindle 6 is the guide or collar 9 against which the work carrier or form 10 bears yieldingly during the cutting operation, and since the cutter shaft or spindle 6 is rotated at high speed, it is desirable that the work carrier or form shall be given its progressive movement as defined by the contour thereof by independent means and at a slower rate of speed. As this is a feature well known in the art it will only be necessary to refer to the fact that the work carrier or form is provided with a sprocket chain 11, which is secured to the work carrier or form and engages a sprocket 12 which may be rotated through a train of mechanism 13 at any desired speed from any convenient part of the machine.

The work carrier slide 5 is provided with a stud and roller 14 which is adapted to engage an opening 15 in the bottom of the work carrier or form, the construction being such that as the latter is moved in accordance with the required conditions it turns about the stud and roller 14 mounted on the work carrier slide.

As hereinbefore noted, the present invention comprehends fluid actuated means for moving the work carrier slide 5 and the work carrier towards and from operative relation with the guide roller 9, and as one means to this end the fluid actuated means comprises a cylinder 16 which, as indicated in the drawings, may be mounted on the table 3 in fixed position below the work carrier slide 5.

Operating within the cylinder 16 is a piston 17 from which extends the piston rod 18 having its end at 19 connected to a downwardly extending member 20 secured to the work carrier slide.

The cylinder 16 has the two fluid passages 21 and 22, one at each end of the cylinder and such fluid passages are connected by pipes 23 and 24 to a four-way valve 25 which may be of any usual and well known construction, the effect being that upon manipulation of the valve 25 to one of its positions the fluid pressure may be admitted to the cylinder 16 at the outer end thereof through the pipe 23 and exhausted at the opposite end of the piston or cylinder, with the result that the work slide 5 and the work carrier 10 mounted thereon will be moved toward operative position into engagement with the guide 9.

The fluid which preferably is air under pressure may be supplied through a pipe 26 and transmitted therefrom to either of the members of the double shaper through the connection 27, Fig. 1.

Inasmuch as when fluid pressure is admitted to the cylinder 16 through the pipe 23 and the exhaust has been established to the pipe 24 by the valve described, it follows that the piston in the cylinder will be given a rapid movement to carry the slide 5 and the work carrier or form into operative position with the guide 9, and in the absence of any means to prevent the work carrier or form from striking the guide 9 with an undesirable force or shock which might result in injury to the parts, means are herein provided for slowing up the piston movement and consequently the movement of the work carrier or form as it approaches the guide 9.

As shown in the present instance of the invention the piston rod 18 within the cylinder 16 is provided with a valve or cushioning stop 28 which is or may be loosely mounted on the piston rod within the cylinder, as indicated, and interposed between the valve or cushioning stop and the piston is a yielding member, such as a spring 29. The cushioning stop or valve 28 is of such dimension that it will partially close the exhaust opening 22 at the left of the cylinder, Fig. 2, as the work carrier or form approaches its operative position, with the result that while the movement of the work carrier or form is at first rapid under the impulse of the fluid pressure admitted through the pipe 23 to the cylinder, such rapid movement is modified or checked as the valve or cushioning stop contacts with the end of the cylinder and partially covers the opening 22.

It may be desirable at times to provide a reservoir for each of the fluid conduits or pipes, such for instance as indicated in dotted lines at 30 and 31, and it will be noted that from the supply pipe 26 and connection 27 the fluid pressure will be conducted by the piping connections 32 and 33 respectively to the reservoirs 30 and 31. This provision of the reservoirs will not always be necessary but in the practical development of the present invention they are found to be preferable.

From the construction described it will be noted that when the work carrier or form has been supplied with the work to be cut, the four-way valve 25 will be operated as by the foot of the attendant to cause a rapid movement of the slide 5 and working carrier or form toward its operative relation into contact with the guide 9, and in order to check such rapid movement and cushion the contact between the work carrier or form and guide 9, the present invention provides a practical and efficient means to secure contact between the work carrier or form and guide without shock.

Another important feature of the invention consists in a fluid operated clamp for the work which consists of a cylinder 34 in which reciprocates the piston 35, the lower end portion having a shoe or bearing 36 which is adapted to engage and rest upon the work 37 mounted upon the work carrier or form.

Connected to the cylinder 34 above the piston 35 is the fluid inlet connection 38 which leads to the four-way valve 25 and through which fluid pressure may be furnished at the same time as the work carrier or form is being moved by such fluid pressure into its operative relation with the guide 9.

In the connection 38 there is provided a controlling valve 38$^a$ by means of which the supply of fluid under pressure to the clamping member may be regulated. By means of this valve 38$^a$ the clamping pressure may be applied or released faster or slower when the valve 25 is actuated by the operator to operative or inoperative position.

Extending from the piston 35 is a rod 39 having threaded to its upper end the adjusting nuts 40 between which and the top of the cylinder is interposed a spring 41, the construction being such that under the action of the fluid pressure the piston may be moved downwardly the distance necessary to engage the work, and when the fluid pressure is removed from the clamp the spring 41 will act through the nuts 40 to raise the work clamp. By adjustment of the nuts 40 the downward pressure exerted by the spring 41 may be widely varied. The resultant pressure exerted by the fluid upon the piston 35 and upon the work may therefore be efficiently controlled.

The cylinder 34 has an opening 42 which may be utilized as an exhaust port below the piston and also for lubricating purposes, and the barrel portion of the piston 43 may be prevented from rotative movement by a key 44.

From the construction described it will be apparent that when the four-way valve is manipulated to move the work carrier or form into its operative relation with the guide 9 that fluid pressure may be transmitted to the work clamp to cause the latter to engage the work slightly before the work carrier or form has reached the end of its stroke and before the cutter 7 has contacted with the work. This is because a much larger volume of fluid is required to move the piston 17 and advance the work form than is required to depress the clamp 36. When fluid pressure is admitted to operatively position the work carrier or form it is simultaneously transmitted to the work clamp, but will first engage the work and remain in such engagement under such fluid pressure as the work carrier or form moves to and finally reaches its operative position.

It may be desirable at times, in accordance with the character of the work to be treated, that it be secured from relative movement of the work carrier or form and this is readily accomplished by pins 45 extending upwardly from the work carrier or form and engaged in openings in the work 37 itself.

Figure 3:
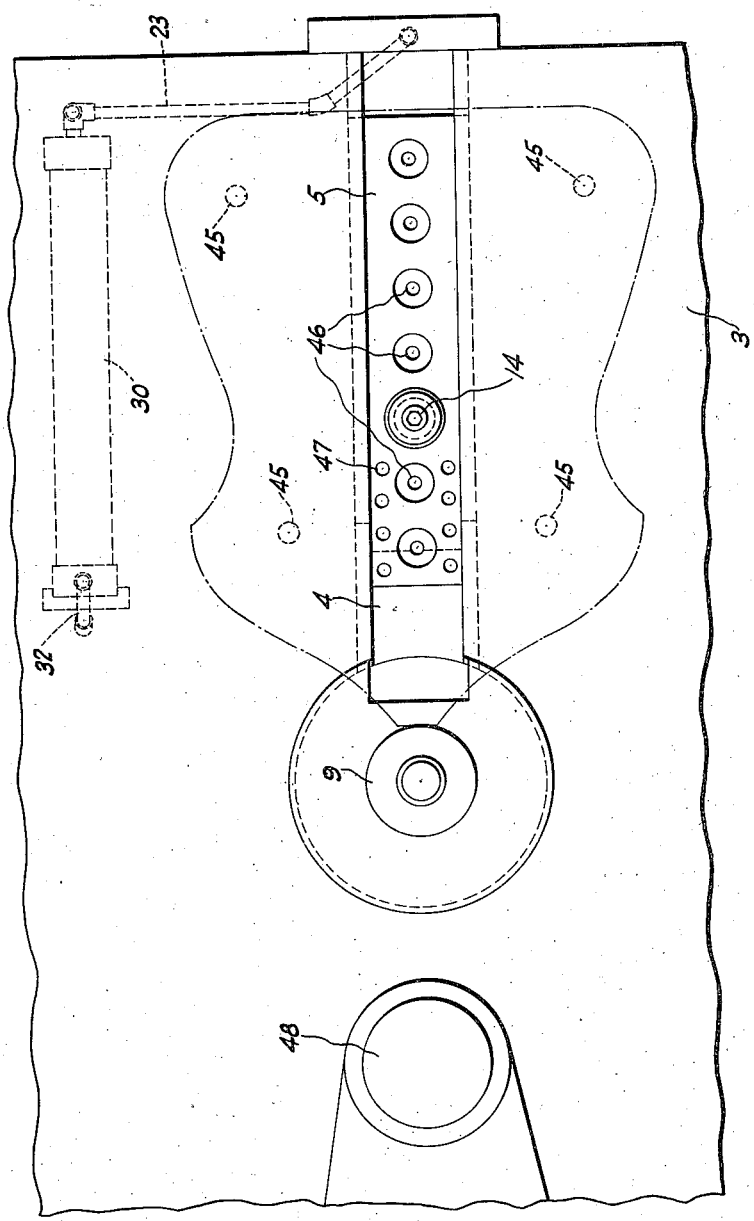
Figure 3 is a fragmentary plan view of the machine with parts omitted showing the work carrier slide.

In adapting the present invention to the treatment of work of different dimensions, the work carrying slide 5 is provided with a number of openings 46, best shown in Fig. 3, any one of which openings may be engaged by the stud and roller 14. In other words, when the work is of large dimensions the connection between the work carrier and slide 5 may be adjusted into any one of the openings 46 in accordance with the size or character of work. Likewise, the member 20 which connects the piston 18 with the slide 5 may be connected to the slide in any one of the several openings, in order to harmonize such connection with the size of the work to be treated.

Figure 2:
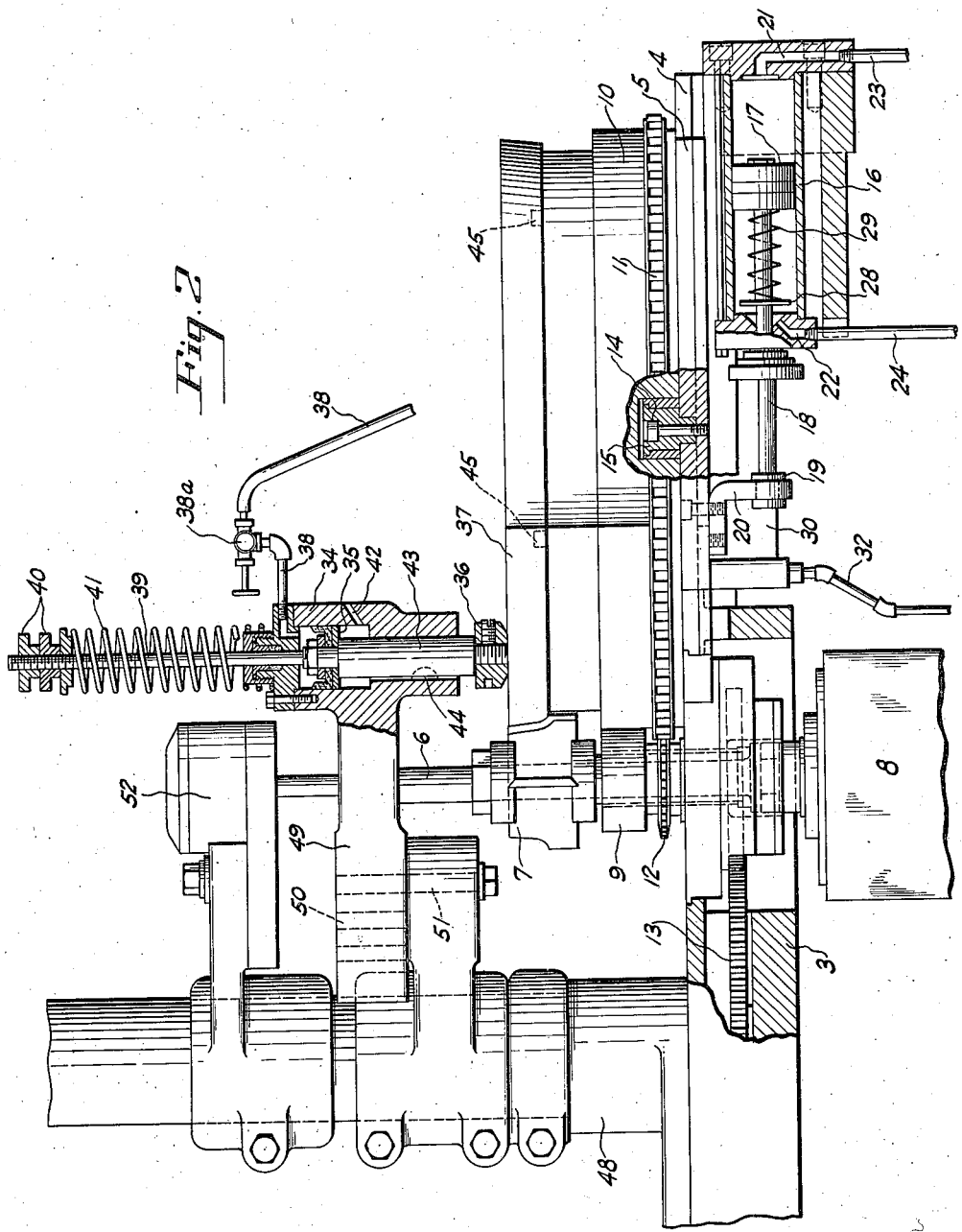
Figure 2 is an enlarged sectional elevation of one of the cutter assembly mechanisms.

The work clamp, as indicated in Fig. 2, may be supported from a column 48 secured to the table 3 and, as shown, the connection consists of an arm 49 which may be either integral with the cylinder 34 or otherwise secured thereto and as it may be desirable at times to have the work clamp engage the work close to or farther from the edge thereof the arms 49 are provided with openings 50, any one of which openings may be engaged by the clamping bolt 51. The column 48 may also support a bearing 52 for the upper extended end of the cutter spindle 6.

What is claimed is:

1. In a wood working machine, the combination of a supporting table, a rotary cutter and work guide, a slide mounted on the table, a work carrier connected to the slide, fluid actuated means connected to the slide for moving the work carrier into engagement with the guide for the cutting operation and for withdrawing it from cutting position, said means comprising a cylinder extending in a direction parallel to the direction of movement of said slide having a fluid passage at each end, a piston between the two fluid passages connected to the slide, and means for controlling the admission of fluid pressure to one end of the cylinder and opening the exhaust at the other end of the cylinder to cause the work carrier to be moved to cutting position and then reversing the fluid pressure and exhaust to withdraw the work carrier or form from cutting position.

2. In a wood working machine, the combination of a supporting table, a rotary cutter and work guide, a slide mounted on the table, a work carrier connected to the slide, fluid actuated means connected to the slide for moving the work carrier into engagement with the guide for the cutting operation and for withdrawing it from cutting position, said means comprising a cylinder extending in a direction parallel to the direction of movement of said slide having a fluid passage at each end, a piston between the two fluid passages connected to the slide, means for controlling the admission of fluid pressure to one end of the cylinder and opening the exhaust at the other end of the cylinder to cause the work carrier to be moved to cutting position and then reversing the fluid pressure and exhaust to withdraw the work carrier or form from cutting position, and manually controlled fluid pressure means forcing said work and work carrier against said table.

3. In a wood working machine, the combination of a supporting table, a rotary cutter and work guide, a slide mounted on the table, a work carrier mounted on the slide, fluid actuated means connected to the slide for moving said slide and work carrier toward the cutter and guide and comprising a cylinder, a piston in the cylinder, a fluid passage connected to each end of the cylinder, a piston rod, a valve mounted on the piston rod, a spring interposed between the valve and piston to cause the valve to partially close the exhaust as the piston approaches the end of its operating stroke, a fluid operated work clamping means, and means to simultaneously admit air to advance said slide toward said cutter and to force said clamping means against the work.

4. In a wood working machine of the character described, the combination of a work carrier, a slide, connections between the slide and work carrier, fluid pressure means for moving the slide and work carrier to cutting position, a fluid operated clamp for holding the work on the work carrier or form, and a control valve common to the fluid operated clamp and the fluid means for moving the slide to first cause the fluid operated clamp to clamp the work on the work carrier and then cause the work carrier to complete its movement to cutting position.

5. In a wood working machine of the character described, the combination of a work carrier, a slide, connections between the slide and work carrier, fluid pressure means for moving the slide and work carrier to cutting position, a fluid operated clamp for holding the work on the work carrier or form, a control valve common to the fluid operated clamp and the fluid means for moving the slide to first cause the fluid operated clamp to clamp the work on the work carrier and then cause the work carrier to complete its movement to cutting position, and manually operated means in the fluid connections to said clamp whereby said clamp may be operated at different points in the movement of said slide.

WILLIAM M. WHITNEY.
AUSTIN W. HAWES.